(12) United States Patent
Lee et al.

(10) Patent No.: US 6,992,293 B2
(45) Date of Patent: Jan. 31, 2006

(54) REAL-TIME INFRARED CHEMICAL IMAGING SPECTROSCOPIC APPARATUS

(75) Inventors: Yao-Chang Lee, Hsinchu (TW); Hau-Wei Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 340 days.

(21) Appl. No.: 10/656,216

(22) Filed: Sep. 8, 2003

(65) Prior Publication Data
US 2004/0119017 A1 Jun. 24, 2004

(30) Foreign Application Priority Data
Dec. 24, 2002 (TW) ................. 91137159 A

(51) Int. Cl.
*G01J 5/02* (2006.01)
(52) U.S. Cl. .................. 250/339.12; 250/339.01; 250/339.02; 250/343; 356/328; 356/51; 356/334
(58) Field of Classification Search ........... 250/339.12, 250/339.01, 339.02, 343; 356/328, 334, 356/51

See application file for complete search history.

(56) References Cited

U.S. PATENT DOCUMENTS

| | | | | |
|---|---|---|---|---|
| 3,839,633 A | * | 10/1974 | McKenna et al. | 250/343 |
| 4,655,225 A | * | 4/1987 | Dahne et al. | 600/316 |
| 4,712,912 A | * | 12/1987 | Messerschmidt | 356/73 |
| 5,011,243 A | * | 4/1991 | Doyle et al. | 359/356 |
| 5,278,413 A | * | 1/1994 | Yamaguchi et al. | 250/347 |
| 5,510,619 A | * | 4/1996 | Zachmann et al. | 250/339.08 |
| 5,729,018 A | * | 3/1998 | Wells et al. | 250/339.08 |
| 6,188,476 B1 | * | 2/2001 | Hafeman et al. | 356/343 |
| 6,784,428 B2 | * | 8/2004 | Rabolt et al. | 250/339.02 |
| 2002/0164810 A1 | * | 11/2002 | Dukor et al. | 436/64 |
| 2003/0057374 A1 | * | 3/2003 | Schuebel et al. | 250/339.08 |

* cited by examiner

*Primary Examiner*—Albert Gagliardi
(74) *Attorney, Agent, or Firm*—Bacon & Thomas, PLLC

(57) ABSTRACT

This invention relates to a real-time infrared chemical imaging spectroscopic apparatus, including a light source for generating infrared radiation. A test sample absorbs a narrow-bandwidth infrared radiation as a result of a monochromator dispersing the infrared radiation and emits thermal radiation. IR camera collects the thermal radiation to form an image. As such, the present invention inspects the test sample in real time without a huge amount of complicated computation. Thus, the efficiency of inspection is increased and the optical design of the apparatus is more compact.

10 Claims, 1 Drawing Sheet

US 6,992,293 B2

REAL-TIME INFRARED CHEMICAL IMAGING SPECTROSCOPIC APPARATUS

BACKGROUND OF THE INVENTION

1. Field of the Invention

The present invention relates to a real-time infrared chemical imaging spectroscopic apparatus, and more particularly to a real-time infrared chemical imaging spectroscopic apparatus for analysis of chemical composition of a microstructure in a non-contact and non-destructive manner.

2. Description of Related Art

Infrared absorption spectrum is one of the methods for analyzing the chemical composition of a material. With the introduction of Fourier transformation technology, the infrared absorption spectrum has been widely applied for analyzing molecular properties and quantities. Even so, both the conventional infrared absorption spectrometer and the Fourier-transform infrared one require sophisticated computation and to be time-consuming to obtain the infrared absorption spectral of a sample.

An example is made with reference to the commercial Fourier-transform infrared spectrometer. A beam of radiation from a source is collimated and impinges on a beam splitter, which transmits approximately half of the radiation and reflects the other half. The resulting twin beams are then reflected from mirrors, one of which is fixed and the other of which is movable. The beams then meet again at the beam splitter, which half of each beam directed toward the sample and detector. The two beams travel in different path length form mirrors and recombine on the beam splitter, then passing through sample together and directed to a detector. In this connection, a time-domain spectra is concerned with changes in radiation power with time has to go through the complex fast Fourier transform (FFT) to obtain a frequency-domain spectra within the information of chemical composition of sample. As such, the sophisticated computation is not only time-consuming but also requires hardware or software in cooperation with signals from a Michelson interferometer. Hence, this spectrometer is complex, excessively large and costly.

SUMMARY OF THE INVENTION

It is a primary object of the present invention to provide a real-time infrared chemical imaging spectroscopic apparatus being a quick, simple, and efficient inspection without involving a huge amount of complicated computation.

It is another object of the present invention to provide a real-time infrared chemical imaging spectroscopic apparatus making the optical design compact so as the size reduced, portability increased, and flexibility in utilizing the space occupied by the apparatus.

To attain the aforesaid objects, a real-time infrared chemical imaging spectroscopic apparatus according to the present invention, in cooperation with a target, comprises a light source, a monochromator, two focusing lenses, a Cassegrain objective, a infrared camera, and a sample stage for holding the target (i.e., test sample). The light source is capable of emitting infrared radiation to be incident on and converged at a first focusing lens. The converged radiation is dispersed by means of the monochromator. After a narrow-bandwidth infrared radiation with a predetermined wavelength is incident on a second focusing lens, being transformed into collimated narrow-bandwidth radiation. The collimated radiation is directed through the test sample so that the sample is excited by the infrared radiation and emits thermal radiation. Then, camera catch image through Cassegrain objective.

The real-time infrared chemical imaging spectroscopic apparatus according to the present invention adopts infrared within a wavelength in the mid-infrared range. The first focusing lens can be any optics capable of focusing infrared radiation. Preferably, the first focusing lens is a cylindrical lens. The second focusing lens can be any optics capable of transforming the narrow-bandwidth infrared radiation. Preferably, the second focusing lens is a spherical lens. Further, the monochromator of the real-time infrared chemical imaging spectroscopic apparatus according to the present invention is equipped with an optical grating to disperse the infrared radiation and to be narrow-bandwidth with a predetermined wavelength.

Furthermore, the IR camera of the real-time infrared chemical imaging spectroscopic apparatus according to the present invention can be any mechanism capable of receiving thermal radiation collected by Cassegrain objective. Preferably, the IR camera is equipped with an infrared focal plane array (IRFPA) Furthermore, the IR camera can be connected to a monitor to display the image formed thereby.

Hence, the design of the real-time infrared chemical imaging spectroscopic apparatus according to the present invention can make a direct inspection, dispensing with a huge amount of complicated computation previously necessary, increasing the efficiency of inspection. Also, the structure as a whole is less complex and much smaller in size, as compared with the conventional same. Thus, the object of forming a compact optical design of the spectroscopic apparatus with reduction in the size and costs is achieved.

The target used in the real-time infrared chemical imaging spectroscopic apparatus according to the present invention can be any conventional sample. Preferably, the target is a biological material, a biological organism, a semiconductor material or a photoelectric material. In addition, not only an infrared image but also information of chemical composition in the infrared image can be provided in real time by the real-time infrared chemical imaging spectroscopic apparatus according to the present invention.

Other objects, advantages, and novel features of the invention will become more apparent from the following detailed description when taken in conjunction with the accompanying drawing.

DETAILED DESCRIPTION OF THE PREFERRED EMBODIMENT

Figure 1:
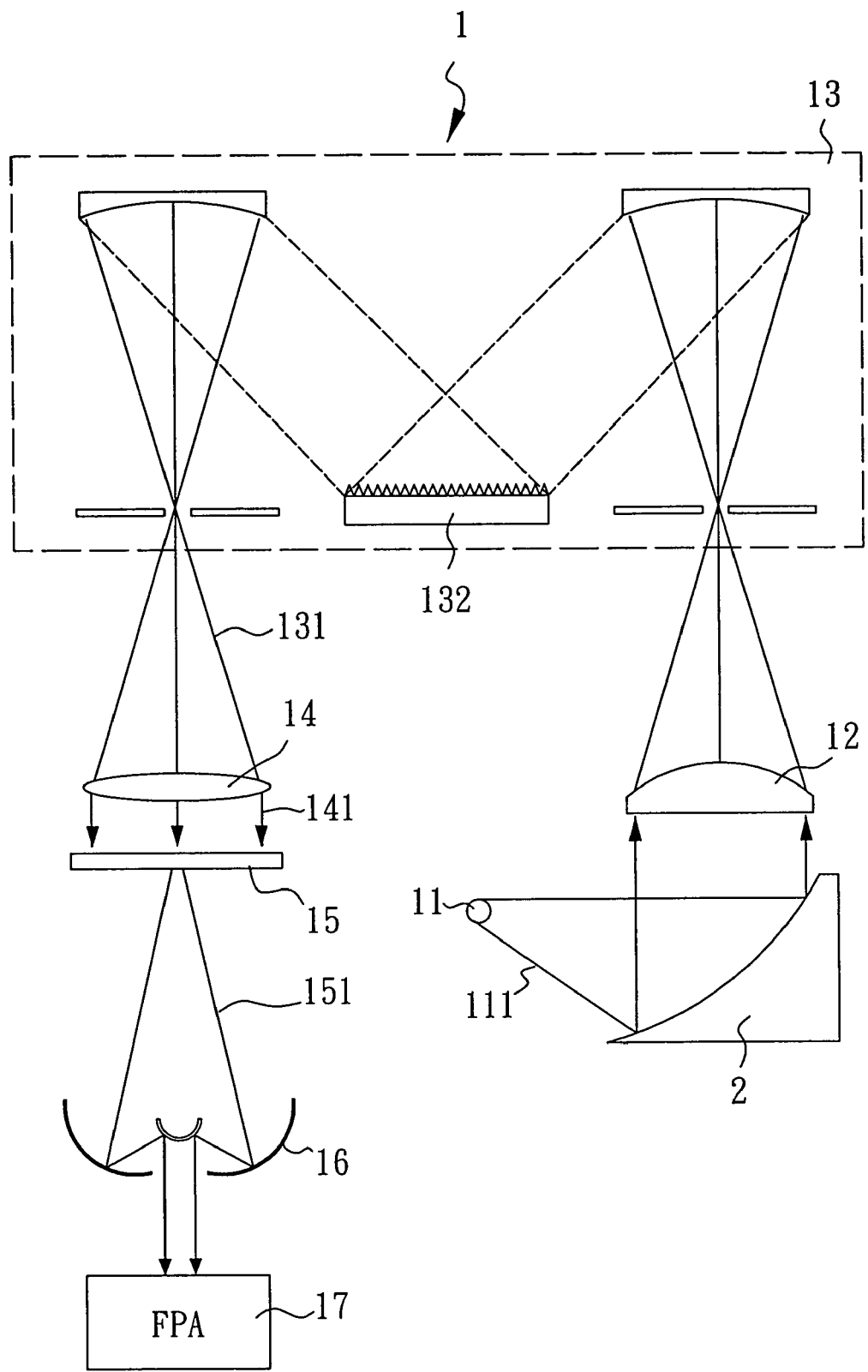
FIG. 1 is a structural diagram of the present invention.

A preferred embodiment according to the present invention is illuminated in FIG. 1, which illustrates a structural diagram of the present invention. There is a light source 11 capable of emitting infrared radiation 111. In this embodiment, the light source 11 is formed by heating silicon carbon (SiC) applied an external power (not shown) to emit infrared radiation. And the wavelength of infrared radiation 111 within the range of 2.5 $\mu$m–25 $\mu$m. The infrared radiation 111 is transformed into collimated light by means of a parabolic mirror 2, the radiation being incident on a first focusing lens 12. The first focusing lens 12 used in the present embodiment is a cylindrical lens to receive and converge the infrared radiation 111. The infrared radiation 111 being converged is incident into monochromator 13. As shown, the monochromator 13 capable of scanning wavelength of infrared radiation 111 continuously over a considerable range disperses the radiation into its component wavelengths. The infrared radiation 131 is incident on the second focusing lens 14. In the present embodiment, the second focusing lens 14 is a spherical lens transforming the infrared radiation 131 into collimated infrared radiation 141. Then, the collimated infrared radiation 141 will be directed onto a sample stage 15 holding a sample (not shown) to illuminate the sample. The sample that absorbs the infrared radiation 141 is capable of emitting characteristic infrared wavelength. The emitting thermal radiation 151 is collected by means of a Cassegrain objective 16. IR camera 17 receives the collected thermal radiation 151 to form a thermal image. The IR camera 17 used in the present embodiment is an infrared imaging detector equipped with an infrared focal plane array (IRFPA), which may be further connected to an external monitor (not shown) to display the image.

Consequently, the test sample absorbs the specific infrared radiation 141 and emits the thermal radiation 151 collected directly by the IR camera 17 to form the image without a huge amount of complicated computation. In addition, the present invention dispenses with machines and transmission lines used in connection with the traditional apparatus. The structure of the present invention is compact so as to increase the portability and flexibility in utilizing the space for the apparatus.

Although the present invention has been explained in relation to its preferred embodiment, it is to be understood that many other possible modifications and variations can be made without departing from the spirit and scope of the invention as hereinafter claimed.

What is claimed is:

1. A real-time infrared chemical imaging spectroscopic apparatus, in cooperation with a target, comprising:
    a light source for emitting infrared radiation;
    a first focusing lens for receiving and focusing said infrared radiation;
    a monochromator for receiving and dispersing said infrared radiation being converged by means of said first focusing lens to form a narrow-bandwidth infrared radiation having a predetermined wavelength;
    a second focusing lens for receiving and transforming said narrow bandwidth infrared radiation into collimated narrow-bandwidth infrared radiation;
    a sample stage for receiving said collimated narrow-bandwidth infrared radiation so that said collimated narrow-bandwidth infrared radiation pass through a target mounted on said sample stage; wherein said target absorbs said collimated narrow-bandwidth infrared radiation and emits thermal radiation;
    a Cassegrain objective for collecting said thermal radiation; and
    an IR camera for receiving said thermal radiation collected by said Cassegrain objective to form an image.

2. The real-time infrared chemical imaging spectroscopic apparatus of claim 1, wherein the wavelength of the maximum intensity peak of said infrared radiation is in the mid-infrared range.

3. The real-time infrared chemical imaging spectroscopic apparatus of claim 1, wherein said wavelength of infrared radiation with in the range of 2.5–25 μm.

4. The real-time infrared chemical imaging spectroscopic apparatus of claim 1, wherein said first focusing lens is a cylindrical lens.

5. The real-time infrared chemical imaging spectroscopic apparatus of claim 1, wherein said second focusing lens is a spherical lens.

6. The real-time infrared chemical imaging spectroscopic apparatus of claim 1, wherein said monochromator is equipped with an optical grating to disperse said infrared radiation and select a narrow-bandwidth infrared radiation with a predetermined wavelength.

7. The real-time infrared chemical imaging spectroscopic apparatus of claim 1, wherein said IR camera is an infrared imaging detector.

8. The real-time infrared chemical imaging spectroscopic apparatus of claim 7, wherein said infrared imaging detector is equipped with an infrared focal plane array.

9. The real-time infrared chemical imaging spectroscopic apparatus of claim 1, further comprising a parabolic mirror disposed between said light source and said first focusing lens to collimate said infrared radiation irradiated from said light source to be incident on said first focusing lens.

10. The real-time infrared chemical imaging spectroscopic apparatus of claim 1, further comprising a monitor connected to said IR camera to display said image.

* * * * *